United States Patent [19]

Perry et al.

[11] Patent Number: 4,869,461
[45] Date of Patent: Sep. 26, 1989

[54] CANISTER PURGE VALVE WITH RESILIENT ARMATURE

[75] Inventors: Paul D. Perry; Julian Czajkowski, both of Chatham, Canada

[73] Assignee: Siemens-Bendix Automotive Electronics Limited, Chatham, Canada

[21] Appl. No.: 234,440

[22] Filed: Aug. 18, 1988

[51] Int. Cl.$^4$ .............................................. F16K 31/06
[52] U.S. Cl. ........................ 251/129.15; 251/129.17
[58] Field of Search ....................... 251/129.17, 129.15

[56] References Cited

U.S. PATENT DOCUMENTS

| 3,034,761 | 5/1962 | Janquart | 251/129.17 X |
| 3,441,246 | 4/1969 | Lauppe et. al. | 251/129.17 X |
| 4,449,691 | 5/1984 | Führer et al. | 251/129.15 X |
| 4,582,088 | 4/1986 | Cook et al. | 251/129.15 X |

Primary Examiner—Arnold Rosenthal
Attorney, Agent, or Firm—Russel C. Wells

[57] ABSTRACT

A flow rate valve comprising a non-magnetic housing comprising a central cavity and a pressure chamber, first and second ports extending into the pressure chamber, the interior end of the first port forming a valve seat. A bobbin is received within the cavity including a coil and a central blind bore enclosed at one end. The bobbin and housing including opposingly situated circumferential grooves. An armature assembly comprising a cylindrical armature within the bore, and a valve element movable with the armature between first and second positions, for opening and closing the valve seat and a motion limiter for limiting armature motion to prevent same from impacting the bottom of the bore in response to a magnetic field generated by the coil.

8 Claims, 1 Drawing Sheet

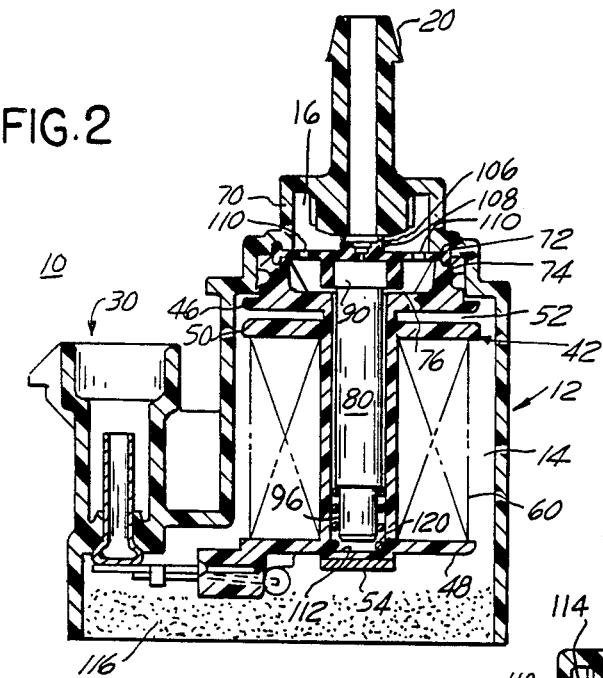
FIG. 2
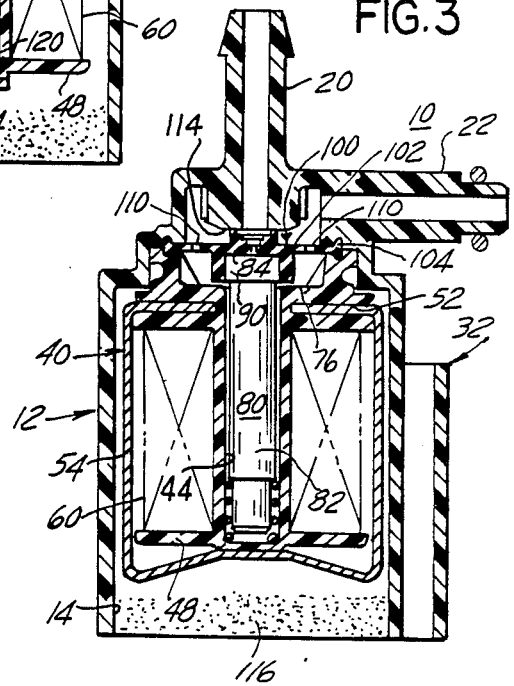
FIG. 3
FIG. 1
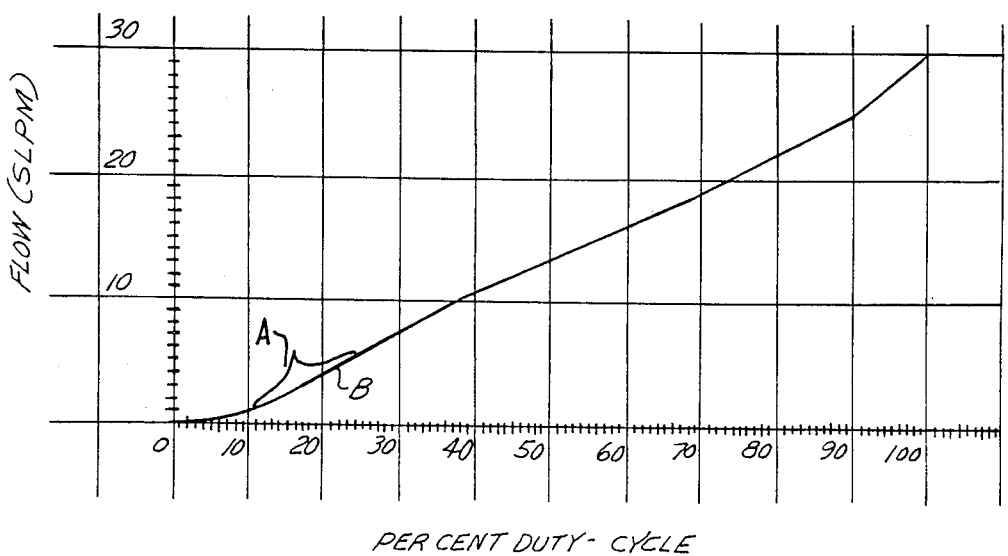

CANISTER PURGE VALVE WITH RESILIENT ARMATURE

BACKGROUND AND SUMMARY OF THE INVENTION

The present invention generally relates to solenoid valves and more particularly to an improved valve which varies the rate at which hydrocarbons can be removed from an evaporation canister.

An evaporation canister forms a part of an emission control system of an internal combustion engine. When the engine is turned off hydrocarbons in the intake manifold of the engine and the fuel tank are communicated to the evaporation canister which contains a filtering element. Upon starting the engine the free hydrocarbons within the evaporation canister are returned to the intake manifold through a return tube where they are combusted. In order to prevent an excessive amount of hydrocarbons from appearing in the exhaust when the engine is initially started the rate which the hydrocarbons are permitted to flow from the canister to the intake manifold must be controlled. Prior evaporation canister systems have included orifices or vacuum devices in the return line to control the rate at which the hydrocarbons enter the intake manifold. Vacuum devices are deficient for controlling the flow rate in that they often provide only an on/off control The present invention provides an improved solenoid which varies the flow rate of hydrocarbons to the intake manifold. Such flow rate may be controlled as function of engine RPM, temperature, manifold vacuum, etc. in cooperation with an electronic control unit of a known type.

It is a requirement of this type of system to control the hydrocarbon flow rate in an accurate and repeatable manner. To control the accuracy of the flow rate, it is necessary to control the magnitude and direction of the magnetic flux generated upon activation of the solenoid which is lodged within the valve's body.

Characteristic of the prior art are valves having cylindrical armatures movable between a position stop formed by a stator and a second stop in contact with a vent passage. The cylindrical armature in response to a control circuit is either modulated or controlled in an on/off manner to cause the armature to move between the first and second positions stops. Typically in order to reduce acoustical noise these armatures may include an elastomeric members at either end to reduce the noise resulting upon impact with the mechanical stops. However, even with the elastomeric members the valves are exceedingly acoustically noisy, such noise increasing as the operating temperature drops. In some instances the noise is sufficiently loud to be heard within the passenger compartment. An additional problem associated with the prior art is that such valve is typically non-linear as illustrated by curve A of FIG. 1. These valves display a significant non-linearity between 10-20 percent duty cycle. It is believed that this non-linearity is caused by the rebound behavior of the rubber elastomeric members on the armature as they impact the hard metal stator or the imposingly situated seat. Linearity of the operation is extremely important in that it determines how much of the flow rate curve can actually be used. As an example, when using a device such as that described above one would not be able to use a signal below a 20% duty cycle and acheive a repeatable and consistent behavior of the valve. In todays pollution control systems it is a requirement to more precisely control low canister purge flow rates in order to accomodate the stringent demands of vapor purge at engine idle conditions. As such, constant and predictable behavior and control is required to span the entire duty cycle range from 0-100% which requirement cannot be met by devices such as described above.

In view of the above it is an object of the present invention to provide an electromechanical valve having a broad operating range. A further object of the present invention is to provide a valve characterized by a low acoustic noise output level. An additional object of the invention is a valve which, within its magnetic circuit does not need a conventional stator.

Accordingly, the invention comprises: a flow rate valve comprising a non-magnetic housing comprising a central cavity and a pressure chamber, first and second ports extending into the pressure chamber. The interior end of the first port forms a valve seat. A bobbin is received within the cavity including a coil and a central blind bore enclosed at one end. The bobbin and housing include opposingly situated circumferential grooves. The valve further includes an armature assembly comprising a cylindrical armature movable within the bore, and a valve element movable with the armature between first and second positions, for opening and closing the valve seat, and means for limiting armature motion to prevent same from impacting the bottom of the bore in response to a magnetic field generated by the coil. The limiting means includes a resilient diaphragm comprising a circumferential lip received within the grooves, a first cylindrical portion about one end of the armature and a second cylindrical portion forming the valve element. The diaphragm in cooperation with the housing defining the pressure chamber.

Many other objects and purposes of the invention will be clear from the following detailed description of the drawings.

BRIEF DESCRIPTION OF THE DRAWINGS

In The Drawings
FIG. 1 illustrates flow versus duty cycle curves.
FIGS. 2 and 3 illustrate cross-sectional views of a flow rate valve.

DETAILED DESCRIPTION OF THE DRAWINGS

FIGS. 2 and 3 illustrate a flow rate valve 10 including a housing generally shown as 12 that is preferably constructed of a non-magnetic, non-electric material such as plastic. The housing defines a central cavity 14 having formed at its upper end a pressure chamber 16 which is communicated to a first port 20 adapted to be connected to a vacuum source such as, engine manifold vacuum and a second port 22 adapted to be communicated to a hydrocarbon storage canister (not shown) in a known manner. The housing 12 may further include an electric connector portion 30 and a bracket portion 32. Received within the housing 12 is a coil assembly 40 comprising a non-magnetic bobbin 42 defining a central bore 44 closed at one end by an end plate 48 and a radial groove or space 52 formed between two spaced members 46 and 50 respectively. Received within the space or groove 52 is a magnetic strap 54 which axially extends along the longitudinal dimension of the bobbin 42 and radially across the end plate 48. The strap 54 may be of generally rectangular construction and provides a preferred magnetic path for the lines of flux produced upon excitation of a coil 60 which is wound about the bobbin. The strap 54 preferrably engages the end plate 48 proximate the central bore 44.

The housing 12 further includes a inwardly directed radial flange 70 having a circumferential groove 72 positioned thereabout. In a similar manner, the top portion of the bobbin proximate the flange 72 includes a similar groove 74. The flange 72 is coaxial with the bore 44 and to a shoulder 76 at the upper end of the bore 44. Slidably received within the bobbin is an armature assembly generally shown as 80. The armature assembly comprises armature 82 having a necked-down portion 84. Molded about the upper end 90 of the armature and the necked-down portion 84 is a diaphragm 100 preferably fabricated of the fluorocarbon rubber such as Viton. The diaphragm 100 includes a radially extending member 102 which terminates in a circumferential lip 104 received within the grooves 72 and 74. The diaphragm may be vented using a series of holes 110 i.e. four (4) through member 102. As will be discussed below, the degree of damping of the armature is controlled by the size of these holes 110. The diaphragm further includes an axially directed portion 106 which serves as the sealing element against a valve seat 114, and another axially extending portion 108 positioned about the end 90 of the armature 82. The length of the armature 82 is sized so as not to bottom-out or engage the end plate 48 as it moves within the bore 44.

The armature 82 may include a narrowed portion proximate its end 96 about which may be received an optional spring 120 which biases the armature outwardly from the bottom 112 of the bore 44 of the bobbin 50. The housing 12 may be sealed with a potting compound 116.

In operation the inherant springiness of the diaphragm 100, or if used spring 120, causes the sealing element 106 to be biased into contact with the valve seat 114 formed about the internal end of port 20. In this unactivated position the armature is suspended within the bore 44 and apart from the end plate 48. Further in this condition the portion 108 of the diaphragm 100 is spaced from the shoulder 76. Further, the vent holes 110 in the diaphragm 100 prevent complete fluid (air, hydrocarbon vapor, etc.) lock in the volume below the diaphragm. In addition, as the armature 82 is moved by magnetic forces the diaphragm will be slightly displaced (up and down as viewed in FIGS. 2 and 3). As the diaphragm 100 is moved up additional fluid will fill the volume below the diaphragm and as the diaphragm moves down fluid within the lower volume will be expelled. The fluid flow across the diaphragm by virtue of this venting or breathing action creates a force tending to damp the motion of the armature (and diaphragm) which contributes to the extended operating results described below. In the embodiment shown the total area of the vent holes 110 was approximately 4–5 mm². The improvement in performance is further enhanced by not permitting the armature to directly contact the bottom of the bore 44. It should also be appreciated that the energy dissipation also occurs in the diaphragm further damping armature motion. The downward motion of the armature 82 is halted when the portion 108 of the diaphragm engages the shoulder 76. It is not a requirement of the invention that the downward motion of the armature 82 be stopped by the diaphragm portion 108. It has been found that such portion 108 may be shortened or eliminated thereby completely suspending the armature 82 in the bore 44. The resulting valve yielded equally improved dynamic performance.

Reference is made to FIG. 1 and in particular curve B which illustrates the flow rate of the above-described valve. The curve B was obtained without the use of the optional spring 110 and the displays a significantly more linear curve in the vicinity from 0 to 20% duty cycle when compared to that of the prior art. It should also be appreciated that the improvement in performance is achieved without using a stator which further reduces the cost of the valve.

Many changes and modifications in the above described embodiment of the invention can, of course, be carried out without departing from the scope thereof. Accordingly, that scope is intended to be limited only by the scope of the appended claims.

We claim:

1. A flow rate valve comprising a non-magnetic housing comprising a central cavity and a pressure chamber, first and second ports extending into the pressure chamber, the interior end of the first port forming a valve seat;

a bobbin received within the cavity including a coil and a central blind bore enclosed at one end;

the bobbin and housing including opposingly situated circumferential grooves;

an armature assembly comprising a cylindrical armature within the bore, and a valve element movable with the armature between first and second positions, for opening and closing the valve seat, and means for limiting armature motion to prevent same from impacting the bottom of the bore in response to a magnetic field generated by the coil, and wherein the limiting means includes a resilient diaphragm comprising a circumferential lip received within the grooves, a first cylindrical portion about one end of the armature and a second cylindrical portion forming the valve element, the diaphragm in cooperation with the housing defining the pressure chamber.

2. The valve as defined in claim 1 wherein the limiting means includes the first cylindrical portion of the diapragm of sufficient size to engage a portion of the bobbin prior to the armature engaging the bottom of bore.

3. The valve as defined in claim 2 including a spring biasing the armature outwardly from the bore.

4. The valve as defined in claim 1 comprising a magnetic strap disposed about the bobbin and armature including a portion engaging the bobbin, proximate to and opposite from the bottom of the bore.

5. The valve as defined in claim 1 including damping means for generating a force tending to damp the motion of the armature.

6. The valve as defined in claim 5 wherein the damping means includes at least one vent hole in the diaphragm.

7. The valve as defined in claim 6 wherein the at least one vent hole is located within a radial portion of the diaphragm and communicates the pressure chamber with the bore.

8. The valve as defined in claim 7 wherein the area of the at least one vent hole is approximately 4–5 mm².

* * * * *